(12) United States Patent
Kirchner et al.

(10) Patent No.: US 6,450,415 B1
(45) Date of Patent: Sep. 17, 2002

(54) ARRESTING DEVICE FOR SUPPORT

(75) Inventors: Georg Kirchner, Solingen; Renate Neumann, Düsseldorf, both of (DE)

(73) Assignee: Halfen GmbH & Co. KG, Langenfeld-Richrath (DE)

( * ) Notice: Subject to any disclaimer, the term of this patent is extended or adjusted under 35 U.S.C. 154(b) by 0 days.

(21) Appl. No.: 10/087,241

(22) Filed: Mar. 1, 2002

Related U.S. Application Data

(63) Continuation of application No. PCT/EP00/08112, filed on Aug. 19, 2000.

(30) Foreign Application Priority Data

Sep. 3, 1999 (DE) .................................... 299 15 435 U

(51) Int. Cl.⁷ ................................................. E01B 9/00
(52) U.S. Cl. ..................................................... 238/315
(58) Field of Search ................................. 238/310, 315, 238/317, 349, 351, 298, 303

(56) References Cited

U.S. PATENT DOCUMENTS

| | | | | |
|---|---|---|---|---|
| 2,133,912 A | * | 10/1938 | Armstrong | 238/349 |
| 3,362,639 A | * | 1/1968 | Van Sant | 238/349 |
| 3,552,649 A | * | 1/1971 | Burwell | 238/310 |
| 3,558,050 A | * | 1/1971 | Sonneville | 238/349 |
| 3,659,784 A | * | 5/1972 | Klosk | 238/310 |
| 4,327,865 A | * | 5/1982 | Greene | 238/310 |
| 4,687,134 A | * | 8/1987 | Burwell | 238/310 |
| 4,795,091 A | * | 1/1989 | Burwell | 238/310 |
| 4,819,869 A | * | 4/1989 | Matlock | 238/298 |
| 5,096,118 A | * | 3/1992 | Matlock | 238/298 |

\* cited by examiner

*Primary Examiner*—S. Joseph Morano
*Assistant Examiner*—Lars A. Olson
(74) *Attorney, Agent, or Firm*—Gudrun E. Huckett

(57) ABSTRACT

An arresting device for mounting rails, supports, and connecting members has a clamping member and an arresting plate with a cam, a bracing section, and a middle section connecting the cam and the bracing section to one another. The middle section receives the clamping member. The bracing section has at least one projection in the form of a pin, wherein the pin has a point projecting away from the bracing section. The pin is made of a material having a greater hardness than the arresting plate. The pin is a stud screw and is fastened in the bracing section by being compression-molded with the material of the bracing section.

12 Claims, 5 Drawing Sheets

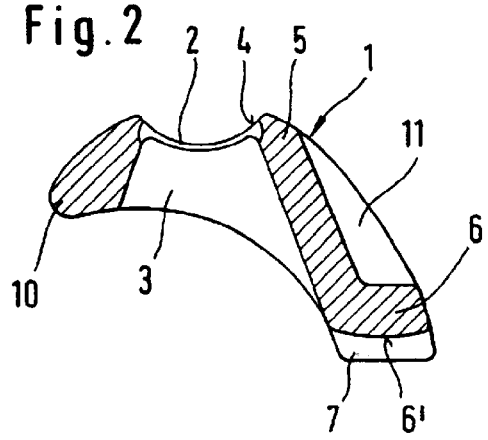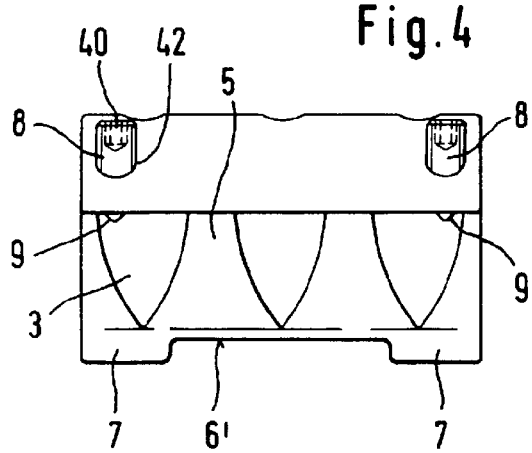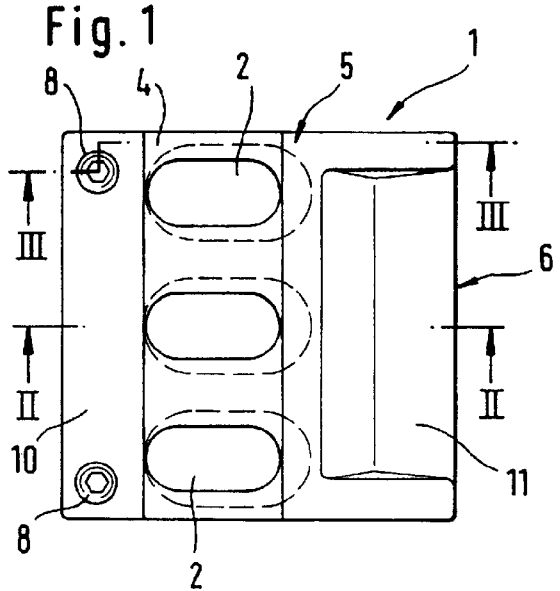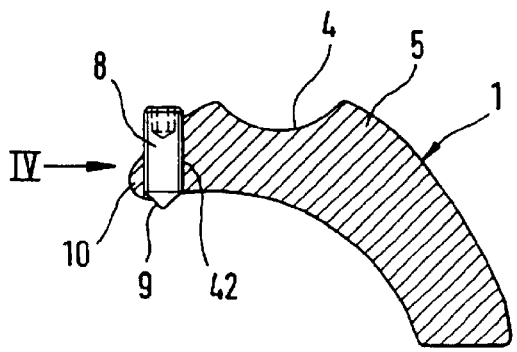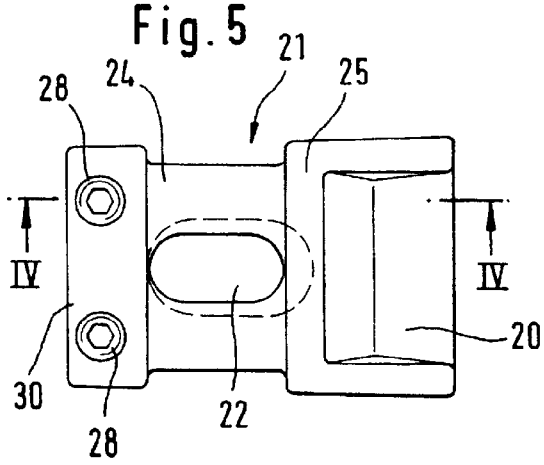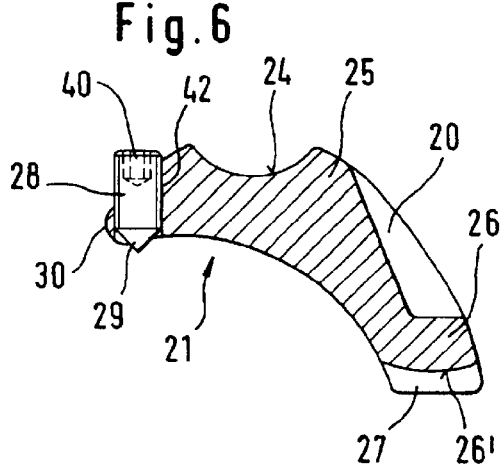

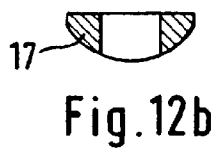
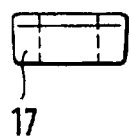
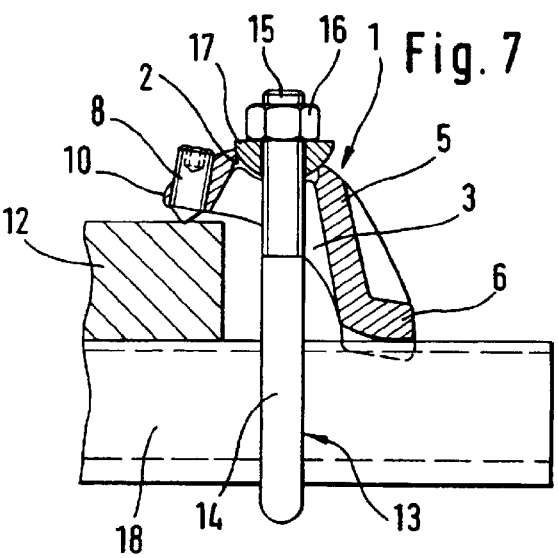
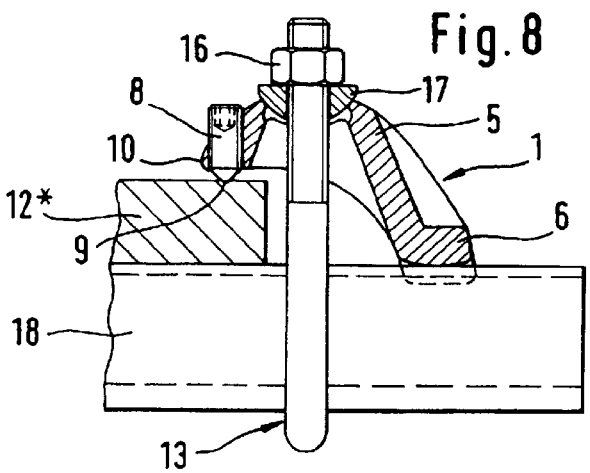
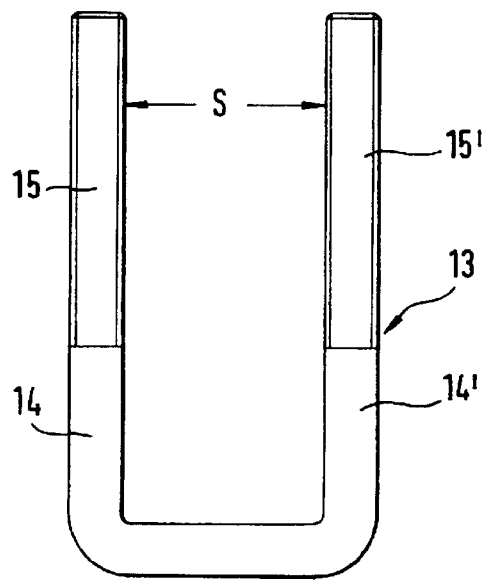
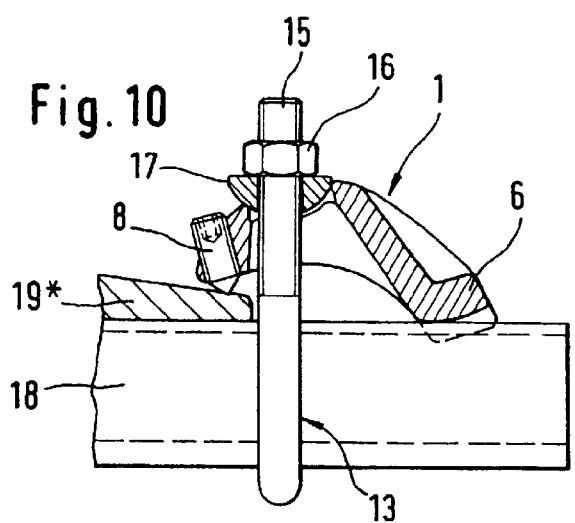
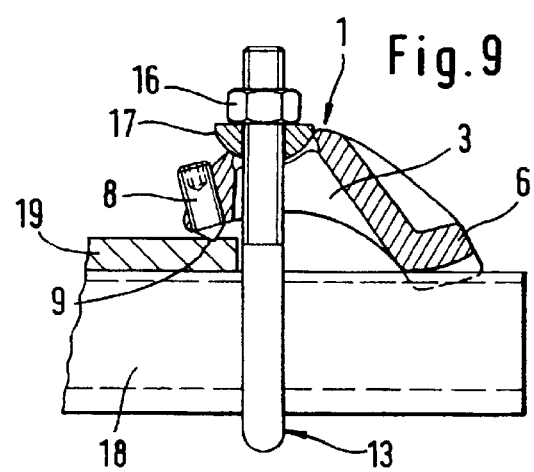

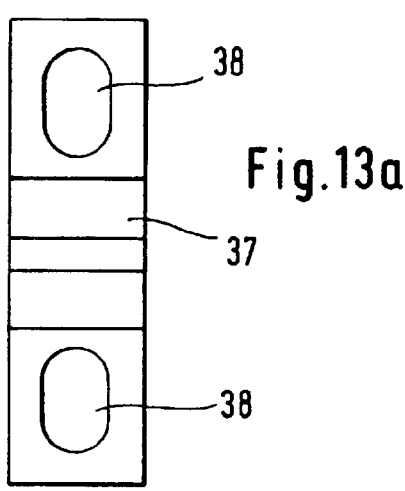
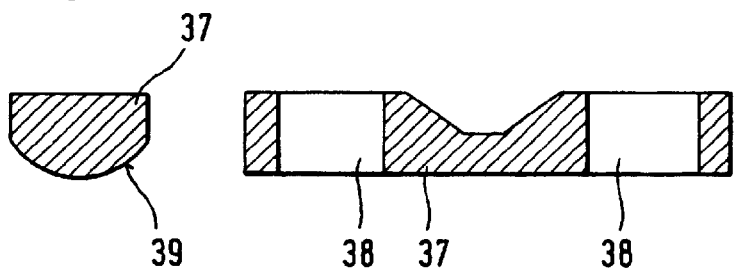
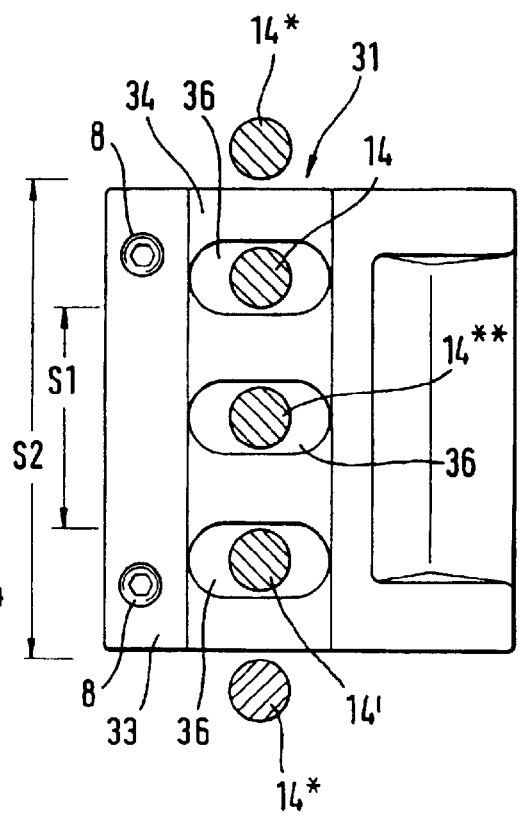
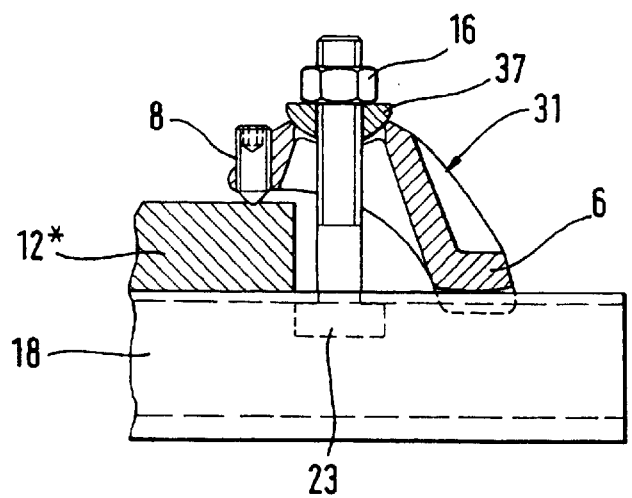

ARRESTING DEVICE FOR SUPPORT

This is a continuation of International Application PCT/EP00/08112 with an international filing date of Aug. 19, 2000, not published in English under PCT Article 21(2), and now abandoned.

BACKGROUND OF THE INVENTION

1. Field of the Invention

The invention relates to an arresting device for mounting rails, supports, connecting parts and the like, comprising an arresting plate having a cam for supporting it on a structural member and a bracing section as well as at least one middle section arranged between them and configured to receive a clamping member, wherein at least one projection in the form of a pin is provided on the bracing section and is formed as a point or tip projecting from the bracing section.

2. Description of the Related Art

For mounting rails, supports, connecting parts and the like, several arresting plates, clamping brackets, claws and the like are known which are either configured as universal clamps or are configured so as to match the particular connecting situation. Such an arresting device is comprised in general of an arresting plate and a clamping element. The arresting plate comprises a cam for supporting the arresting device on a structural member and a bracing section, for example, for clamping a flange, and a saddle formed between the cam and the bracing section. The clamping element is usually received in the saddle.

With the conventional arresting devices, a high surface pressure between the bracing section and the flange of a support is achieved but when the clamping force decreases there is hardly any resistance against sliding in the transverse direction. It has therefore already been suggested to provide the clamping surface with grooves or corrugations; however, experiments have shown that even with this measure no significant improvement with regard to the securing force in the transverse direction can be achieved. In such arresting devices the resistance against sliding as a function of the surface pressure cannot be precisely defined. The load distribution depends on many unknown factors such as the friction coefficient of the structural member in the thread, maintaining the tightening torque and the like.

In U.S. Pat. No. 4,819,869 a device for attaching railroad rails to wooden railroad ties is described. In this connection, a plate is provided for supporting the rail on the railroad tie which is secured by means of screw anchors on the wooden tie. In order to secure the rail on the plate, holding-down elements are provided on both sides of the rail which are supported on the plate by means of a cam and on the foot of the rail by means of a bracing section. The bracing section is provided with two steel points embedded in the bracing section. The holding-down elements are fastened by means of screw anchors which are threaded into sleeves in the wooden tie. Such an arrangement is useful only to a limited extent.

SUMMARY OF THE INVENTION

It is an object of the present invention to provide an arresting device of the aforementioned kind which can be produced in a simple way and which can be used universally for different connecting arrangements.

In accordance with the present invention, this is achieved in that the pin is comprised of a harder material than the arresting plate and the pin is configured as a stud screw connected by compression molding with the material of the bracing section.

The pin can be secured in a threaded bore of the bracing section. This stud screw can be provided at the end opposite the point with a hexagon socket for receiving a matching tool. The pins can be received either in a throughbore, in a blind bore, or a stepped bore.

Especially expedient is an embodiment in which two pins are arranged at a spacing to one another whose points at least approximately project to the same extent or amount (distance) away from the bracing section. In this way, an approximately uniform penetration of the points and a uniform force distribution are ensured.

At least one opening for penetration of a tie anchor should be provided in the saddle. Expediently, this opening is formed as a slotted hole. It is especially advantageous when three openings are provided so that, depending on the rail or support to be mounted, one or two tie anchors can be symmetrically employed, as desired. In the case of arresting plates with three openings, it is also possible to employ bracket-shaped clamping elements with different leg spacing.

In order to ensure in a simple way an adjustment to the flange shape and flange thickness, the arresting plate must be configured to be positioned at different angles relative to the clamping element. In order for the force introduction of the clamping element onto the arresting plate to be uniformly unaffected as much as possible independent of the position, it is suggested that the saddle at its upper side is configured as a concave depression or as a convex outwardly projecting bulge and that in this depression or on this bulge a spherical cap or a clamping strip with matching surface is positioned.

BRIEF DESCRIPTION OF THE DRAWING

In the drawing:

FIG. 1 is a plan view onto an arresting plate;

FIG. 2 is a section along the line II—II of FIG. 1;

FIG. 3 is a section along the line III—III of FIG. 1;

FIG. 4 is a view in the direction of arrow IV of FIG. 3;

FIG. 5 is a variant of the embodiment of FIG. 1 provided with only one opening for receiving a clamping element;

FIG. 6 is a section along the line VI—VI of FIG. 5;

FIG. 7 is an illustration of an arresting device for clamping a first flange configuration;

FIG. 8 is an illustration of an arresting device for clamping a second flange configuration;

FIG. 9 is an illustration of an arresting device for clamping a third flange configuration;

FIG. 10 is an illustration of an arresting device for clamping a fourth flange configuration;

FIG. 11 is a clamping bracket shown as an individual part;

FIG. 12a is a plan view of a spherical cap;

FIG. 12b is a section view of a spherical cap;

FIG. 12c is a side view of a spherical cap;

FIG. 13a is a plan view of a clamping strip;

FIG. 13b is a cross-section view of a clamping strip;

FIG. 13c is a longitudinal section view of a clamping strip;

FIG. 14 is a variant of the embodiment of FIG. 1 with different possibilities of positioning the clamping means;

FIG. 15 is a variant of the embodiment of FIG. 8;

DESCRIPTION OF THE PREFERRED EMBODIMENTS

Figure 16:
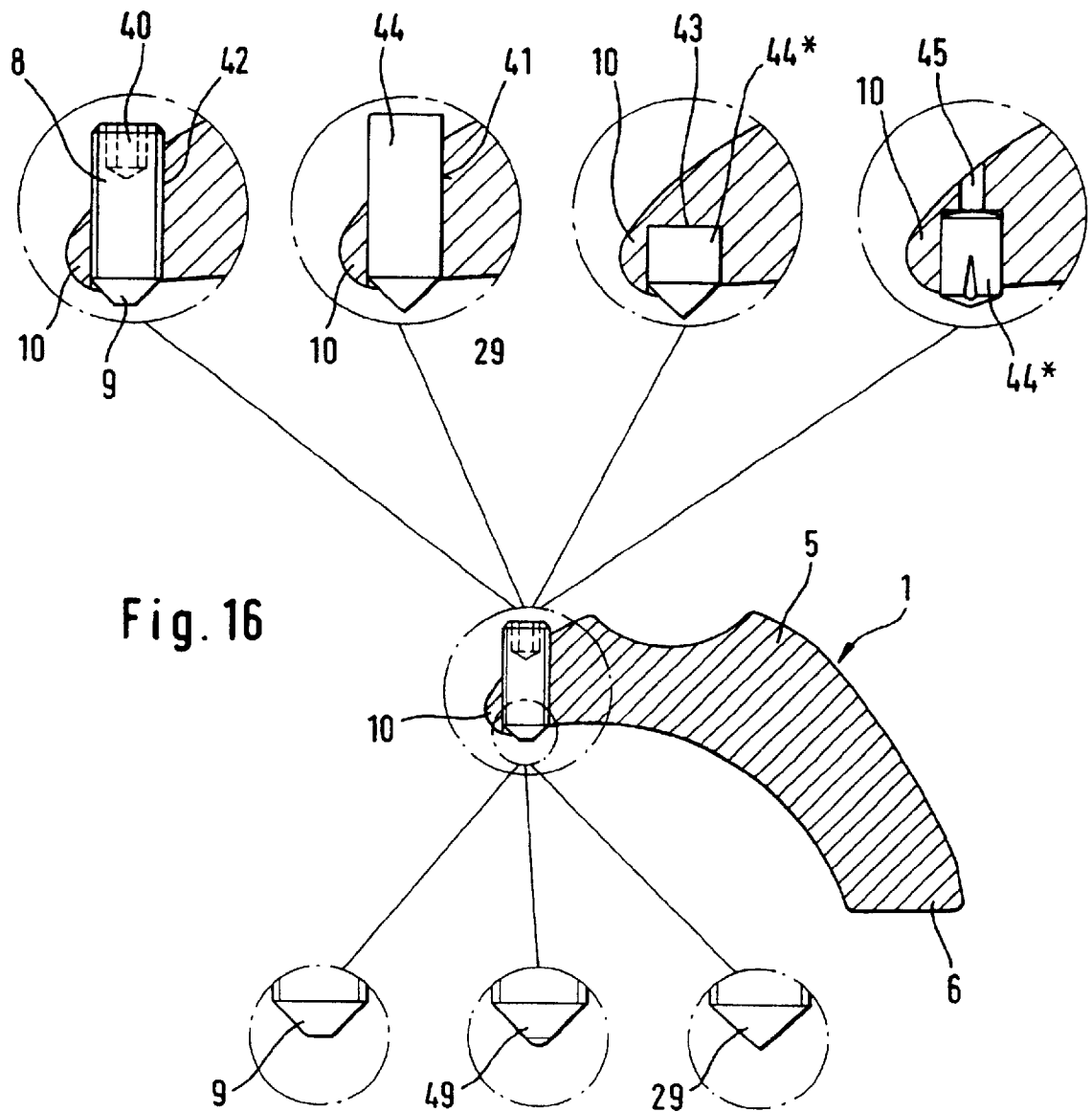
FIG. 16 shows different embodiments of pins and their attachment in the bracing section of the arresting plate as well as different embodiments of the points or tips.

In FIGS. 1 through 4 an arresting plate 1 is illustrated which comprises a cam 6, a bracing section 10, and a middle section in the form of a saddle 5 arranged therebetween. In the area of the saddle 5, three slotted holes 2 are arranged whose longitudinal axes extend parallel to one another. On the upper side of the saddle 5 a concave depression 4 is provided. The underside of the arresting plate 1 is arc-shaped or curved. From the slotted hole 2 to the arc, a conically widened portion 3 is provided. On the side of the saddle 5 facing the cam 6 the arresting plate 1 is provided with a recess 11. At the lower end of the cam 6 a bearing surface 6' is provided against which the structural member to be connected rests. Laterally adjacent to the bearing surface 6' projections 7 are provided so that a structural member positioned on the bearing surface 6' is laterally engaged. In the bracing section 10 pins 8 are provided which have points or tips 9. They project away from the underside of the bracing section 10.

FIGS. 5 and 6 show an arresting plate 21 which has only a single slotted hole 22. On the top side of a saddle 25 a concave depression 24 is provided. The saddle 25 is provided with a recess 20 in the direction toward the cam 26. The underside of the cam 26 is configured as a bearing surface 26' with projections 27 adjacent to the bearing surface 26'. On the opposite end of the arresting plate 21 a bracing section 30 is provided in which two pins 28 with points 29 formed thereon are secured.

In the embodiments of FIGS. 1 through 6, the pins 8 or 28 are formed as stud screws with a hexagon socket 40 on the end of the stud screw remote from the tip 9 or 29. This stud screw is secured in a threaded bore 42 in the bracing section 10, 30, respectively.

FIGS. 7 through 10 show that the arresting device comprised of the arresting plate 1 and a clamping member in the form of a clamping bracket 13 is suitable for fastening different supports and flanges. The clamping member or clamping bracket 13 is illustrated as an individual part in FIG. 11. This clamping bracket 13 has two parallel extending legs 14 and 14' wherein each one of these legs 14, 14' is provided with a threaded section 15, 15'. The spacing S between the legs 14, 14' is determined by the respective size or spacing of the slotted holes 2 in the arresting plate 1. Between the legs 14, 14', a rail 18 is received which is to be connected with a support 12 (FIG. 7) or 12* (FIG. 8). As can be seen clearly in FIGS. 7 through 9, the supports 12 and 12* have different thickness. With the aid of the arresting plate 1, however, the connection can be realized independent of the respective thickness of the support 12, 12* without requiring any changes, because, on the one hand, the position of the arresting plate 1, relative to the clamping bracket 13, is variable and, on the other hand, there is always a suitable contact of the cam 6 on the rail 18 as a result of the contour of the bearing surface 6'. Moreover, the point 9 of the pin 8 can penetrate into the surface of the supports 12 or 12* in both positions of the arresting plate 1.

FIGS. 9 and 10 show the arresting plate 1 in connection with a clamped rail flange as an example, wherein in FIG. 9 a straight flange 19 and in FIG. 10 a slanted flange 19* are illustrated. In FIGS. 7 through 10, a spherical cap 17 is provided as an intermediate member for providing a suitable supporting action for a clamping nut 16 threaded onto the threaded section 15 of the clamping member in the form of a tie anchor. The spherical surface of the cap 17 always ensures a suitable contact and force introduction into the saddle 5 of the arresting plate 1.

The spherical cap 17 is illustrated in FIG. 12 in three different views wherein FIG. 12a shows a plan view, FIG. 12b shows a section, and FIG. 12c a side view of the spherical cap.

Instead of employing individual spherical caps, it is also possible to employ a clamping strip 37 as an intermediate member, as illustrated in FIG. 13. In this connection, FIG. 13a shows a plan view onto the clamping strip 37 having two slotted holes 38. As illustrated in FIG. 13b, the cross-section of the clamping strip 37 is of such a configuration that the top side of the clamping strip 37 is planar and the underside is shaped like a cylinder section. This means that the underside has a bulge or convexity 39. FIG. 13c shows a longitudinal section of the clamping strip 37 with the two slotted holes 38. The slotted holes 38 enable receiving of clamping means at different spacings, i.e., even clamping brackets with different spacings of the parallel legs can be received in the slotted holes 38; alternatively, round holes can also be provided.

FIG. 14 shows a plan view onto an arresting plate 31 which correspond substantially to the one illustrated in FIG. 1. Accordingly, the cam 6 as well as the bracing section 33 with the pins 8 arranged therein are identical. The arresting plate 31 has a cylinder section-shaped depression 34 in which three parallel slotted holes 36 are arranged. In FIG. 14 several positions of clamping elements are illustrated in an exemplary fashion, wherein these are the legs 14, 14', 14*, 14** of clamping brackets. In this connection, not only a symmetrical arrangement of the legs 14, 14' or 14* is possible, but also an asymmetrical arrangement of legs 14* and 14**. With such a configuration of the arresting plate 31 a plurality of different leg spacings can be realized wherein two examples are illustrated in FIG. 14, i.e., a spacing S1 between the legs 14 and 14', and a spacing S2 between the legs 14* which are positioned laterally adjacent to the arresting plate 31, respectively. For such a leg spacing it is however required to provide a clamping strip 37 of a corresponding length by which the force of the clamping elements can be transmitted onto the arresting plate 31.

FIG. 15 shows a section of an arresting device which is fastened by means of a clamping member in the form of a hammer head screw 23 on the profiled rail 18 and clamps a support 12'. Otherwise, this embodiment of FIG. 15 corresponds to that of FIG. 8 so that the same reference numerals are employed for the same parts.

FIG. 16 shows different embodiments of pins and points or tips. As already illustrated in the above described Figures, the bracing section 10 can be provided with threaded bores 42 into which the threaded pins 8 in the form of stud screws are threaded. On the end which projects downwardly from the bracing section 10, the pin 8 is provided with the tip or point 9 which in the present case has a small flattened area. The pin 8 is comprised of a hard or hardened material so that it is capable of penetrating into the softer material of the object to be clamped. At the end remote from the point 9, the pin 8 has a hexagon socket 40 for use in connection with a matching tool.

The pin 44, as illustrated in the lower area of FIG. 16, can have a point 29 which is completely conical. As an alternative thereto, it is also possible to configure the front end as a spherical section as illustrated in the example of point 49. In the upper area of FIG. 16, it is also illustrated that in the bracing section 10 a blind bore 43 is arranged in which the pin 44\* can be received. This pin 44\* can be fastened in the bracing section by compression-molding or pressing with the material of the bracing section 10. There is also the possibility of configuring the bore as a stepped bore 45 into which the pin 44\* is then inserted.

Figure 17:
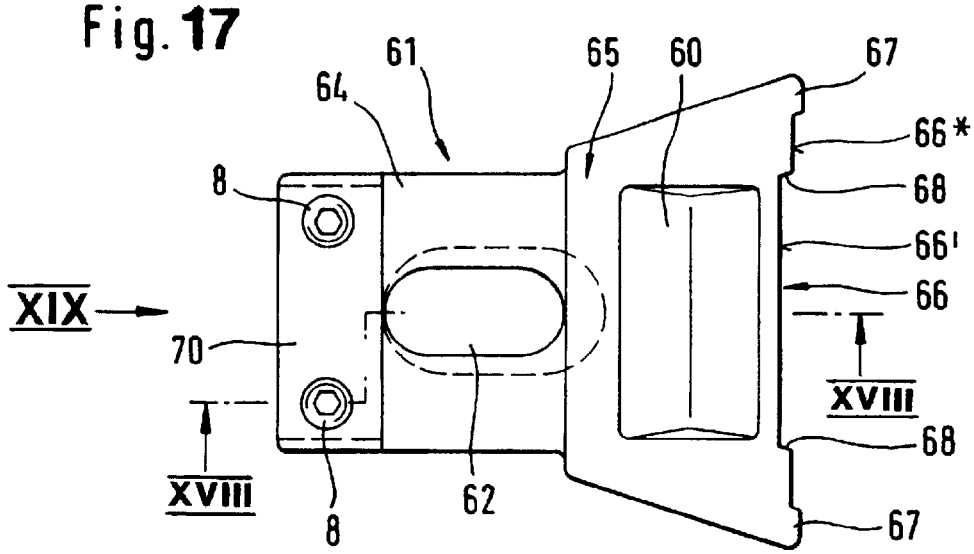
FIG. 17 is a variant of the embodiment of FIG. 5 for use in connection with profiled members of different widths.
Figure 18:
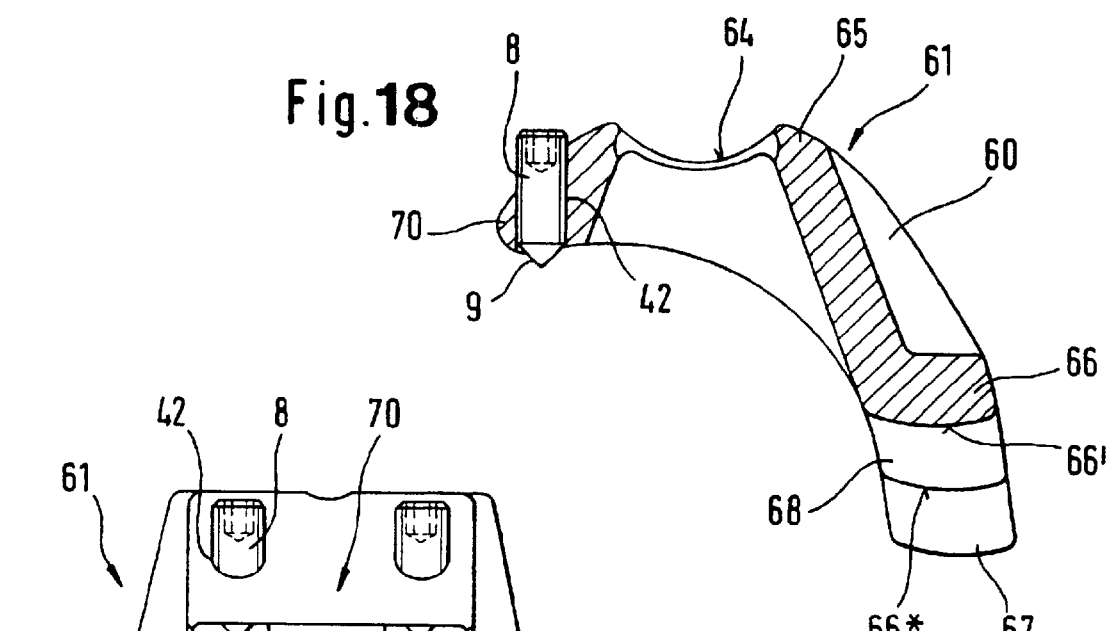
FIG. 18 is a section along the line XVIII—XVIII of FIG. 17.
Figure 19:
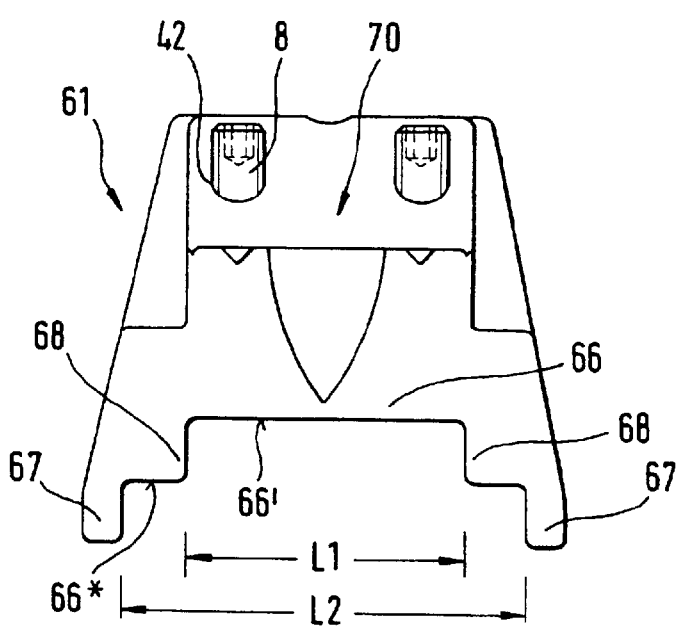
FIG. 19 is a view in the direction of arrow XIX of FIG. 17.

FIG. 17 shows a plan view onto an arresting plate 61 whose section is illustrated in FIG. 18 and whose side view is illustrated in FIG. 19. This arresting plate 61 has a depression 64 with a slotted hole 62 wherein the depression 64 is arranged between a saddle 65 and a bracing section 70. The saddle is provided in the direction toward the cam 66 with a recess 60. In the bracing section 70 the pins 8 are provided in threaded bores 42 in the same way as described in connection with FIG. 1. At the lower end of the cam 66, projections 67 extending downwardly are arranged on both sides; adjacent thereto, a step 68 is provided on the inner side of the projections, respectively, i.e., the steps 68 are facing one another. Between these steps 68 a first bearing surface 66' is formed which has a length L1 corresponding to the distance between the steps 68. In contrast, the distance L2 between the projections 67 is greater. Adjacent to the projections 67, partial surfaces of a second bearing surface 66\* are formed by the steps 68. The configuration according to FIGS. 17 through 19 has the advantage that the arresting plate 61 can be used without changes for different profile widths or the like.

While specific embodiments of the invention have been shown and described in detail to illustrate the inventive principles, it will be understood that the invention may be embodied otherwise without departing from such principles.

What is claimed is:

1. An arresting device for mounting rails, supports, and connecting members, the arresting device comprising:

a clamping member (13, 23);

an arresting plate (1, 21, 31, 61) comprising a cam (6, 26, 66), a bracing section (10, 30, 70), and a middle section (5, 25, 65) connecting the cam (6, 26, 66) and the bracing section (10, 30, 70) to one another, wherein the middle section (5, 25, 65) is configured to receive the clamping member (13, 23);

wherein the bracing section (10, 30, 70) comprises at least one projection in the form of a pin (**8, 28, 44, 44\*, 47), wherein the pin (8, 28, 44, 44\*) has a point (9, 29, 49) projecting away from the bracing section (10, 30, 70**);

wherein the pin (**8, 28, 44, 44\*, 47) is comprised of a material having a greater hardness than the arresting plate (1, 21, 31, 61**);

wherein the pin (**8, 28, 44, 44\*, 47) is a stud screw and is fastened in the bracing section (10, 30, 70) by being compression-molded with the material of the bracing section (10, 30, 70**).

2. The arresting device according to claim 1, wherein the bracing section has a throughbore (41) and the pin (44) is received in the throughbore (41).

3. The arresting device according to claim 1, wherein the bracing section (10, 30, 70) has a threaded bore (42) and the pin (44) is secured in the threaded bore (42).

4. The arresting device according to claim 1, wherein the bracing section has a blind bore (43) or a stepped bore (45) for receiving the pin (44).

5. The arresting device according to claim 1, wherein two of the pins (8, 28, 44, 44\*) are provided and are spaced at a distance from one another, wherein the points of the two pins project at least substantially by the same amount away from the bracing section (10, 30, 70).

6. The arresting device according to claim 1, wherein the middle section is a saddle (5, 25, 58, 65).

7. The arresting device according to claim 6, wherein the middle section (5, 25, 65) has at least one opening (2, 22, 36, 62) for receiving the clamping member (13, 23).

8. The arresting device according to claim 7, wherein the at least one opening (2, 22, 36, 62) is a slotted hole.

9. The arresting device according to claim 7, further comprising an intermediate member interacting with the saddle (5, 25, 65), wherein the saddle has an upper side with a depression (4, 24, 64), wherein the depression (4, 24, 64) is concave or cylinder section-shaped, wherein the intermediate member (17, 37) is positioned in the depression and the clamping member is a tie anchor supported via the intermediate member on the saddle.

10. The arresting device according to claim 9, wherein the intermediate member is a spherical cap (17) or a clamping strip (37) pressed into the depression by the tie anchor.

11. The arresting device according to claim 1, wherein the cam (6, 26, 66) has two projections (7, 27, 67) and one or more bearing surfaces extending between the two projections (7, 27, 67).

12. The arresting device according to claim 9, wherein the two projections (67) have sides facing one another and wherein the sides have a step (68), respectively, wherein a first one of the bearing surfaces (66') extends between the steps (68) and wherein a second one of the bearing surfaces (66\*) is formed by the steps (68), wherein a distance between the steps (68) is smaller than a distance between the projections (67) delimiting the second one of the bearing surfaces (66\*).

\* \* \* \* \*